United States Patent [19]
Choo et al.

[11] Patent Number: 5,911,159
[45] Date of Patent: Jun. 8, 1999

[54] RESIN CURE MONITORING

[75] Inventors: Vincent K. Choo, Las Cruces; Manuel V. Gomez, Derry, both of N. Mex.

[73] Assignee: New Mexico State University Technology Transfer Corporation, Las Cruces, N. Mex.

[21] Appl. No.: 08/964,593

[22] Filed: Nov. 5, 1997

Related U.S. Application Data

[60] Provisional application No. 60/030,732, Nov. 7, 1996.

[51] Int. Cl.$^6$ ........................................... G01H 3/00
[52] U.S. Cl. .................................. 73/590; 73/632
[58] Field of Search ............................. 73/590, 597, 598, 73/632; 356/133; 606/69; 324/649

[56] References Cited

U.S. PATENT DOCUMENTS

| | | |
|---|---|---|
| 3,825,887 | 7/1974 | Murry ........................................ 340/15 |
| 4,590,803 | 5/1986 | Harrold . | 
| 4,921,415 | 5/1990 | Thomas, III . |
| 5,731,521 | 3/1998 | Lanagan et al. ........................... 73/632 |

OTHER PUBLICATIONS

Brown, Acoustic Ultrasonic Monitoring United States Statutory Invention Registration, Reg. #H465, May 3, 1988.

*Primary Examiner*—Hezron Williams
*Assistant Examiner*—Thuy Vinh Tran
*Attorney, Agent, or Firm*—Rod D. Baker; Deborah A. Peacock

[57] ABSTRACT

Method and apparatus for monitoring curing in a resin. Acoustic, ultrasonic waves are propagated through a waveguide disposed through a quantity of resin while the resin is curing. The waves are transmitted and received by transducers arranged in an acousto-ultrasonic configuration with respect to a flexible waveguide. The waveguide may be made from bundled fibers. The velocity or amplitude of the acoustic waves is affected by the physical characteristics of the resin sample. Monitoring changes in the speed or amplitude of the propagated waves permits changes in the resin to be monitored in real time. Only a small sample quantity of resin need be employed.

24 Claims, 6 Drawing Sheets

RESIN CURE MONITORING

CROSS-REFERENCE TO RELATED APPLICATIONS

This application claims the benefit of the filing of U.S. Provisional patent application Ser. No. 60/030,732, entitled "Resin Cure Monitoring System," filed on Nov. 7, 1996, and the specification thereof is incorporated herein by reference.

BACKGROUND OF THE INVENTION

1. Field of the Invention (Technical Field)

The present invention relates to resin cure monitoring, specifically methods and apparatus for acoustically monitoring physical and chemical changes in a resin during the curing thereof

2. Background Art

Thermosetting resin compositions are increasingly used in various manufacturing processes for the production of structural parts in vehicles and buildings, as well as the production of electronic devices. Resins frequently are cured by heating, whereby the temperature and duration of heating are carefully controlled to optimize curing conditions to promote maximum strength in the final product. Properly managing the curing process by raising or lowering the curing temperature, or carefully timing the termination of heating, ideally is accomplished by monitoring the degree of cure in the resin composition and adjusting the temperature in response thereto. For example, it is desirable to detect precisely when the optimum degree of cure has been realized, so that the application of heat can be terminated before over-curing occurs. To this end, efforts have been made to develop methods and apparatus for monitoring the curing of resin compositions. These efforts have been directed primarily to the development of systems for monitoring resin products directly and in situ, rather than systems for monitoring small samples, the results of which can be correlated to the curing of a product.

One mode for monitoring the curing of a thermosetting resin material is through the propagation of acoustic waves through the resin. Basic acoustic monitoring has previously been accomplished by locating an ultrasonic transmitter against one side of a resinous bulk body, and placing an ultrasonic receiver against the opposite side. Ultrasonic waves are then propagated through the bulk body while it cures. The chemical and physical changes undergone by the bulk body while it cures affect the acoustic waves received by the acoustic receiver. The changes in the waves are monitored in an effort to ascertain the rate and degree of cure. This method of cure monitoring has a considerable margin of error due to the diffusion of the ultrasound waves as they propagate through the medium of a resinous bulk body. The diffusion of the acoustical waves limits the sensitivity of the method to the subtle chemical and physical changes manifested in the resin during curing.

U.S. Pat. No. 4,590,803 to Harrold discloses an acoustic system for monitoring changes in a bulk body during a phase change from liquid to solid. Harrold proposes to improve the sensitivity of acoustical monitoring by disposing a waveguide through the bulk body while the body is still in the liquid state, and then transmitting and monitoring ultrasonic waves through the waveguide while the bulk body solidifies. The margin of error in the monitoring of the cure purportedly is reduced because the waveguide curtails undesirable diffusion of the acoustic signal. The '803 patent to Harrold, however, teaches that the resin cure be monitored using a resinous bulk body of substantial size. Thus, the Harrold device and manner for cure monitoring requires that a substantial volume of liquid resin be poured into a mold or container, the waveguide immersed in the liquid resin, and special provision made for the entry and exit of the waveguide through sealable apertures in the container walls.

U.S. Pat. No. 4,921,415 to Thomas, et al., shows a cure monitoring apparatus having high temperature ultrasonic transducers. The Thomas device requires the use of a mold with special transducer assemblies. The transducers are placed within the mold. When the device is heated, either comparatively expensive, specially designed high temperature transducers must be used or a special transducer cooling system must be employed.

Previous efforts, such as those by Harrold and Thomas, et al., have demonstrated the desirability of acoustical methods for monitoring the curing of resin compositions and compounds. Nevertheless, a need remains for a method and apparatus for acoustically monitoring the curing of a resin, which method and apparatus permits the monitoring to be performed with energy efficiency upon comparatively small quantities of resin, thus obviating the need for special monitoring molds with sealable apertures. Also, a need remains for a method and apparatus for monitoring the cure of a comparatively small quantity of resin, but which uses ordinary, comparatively inexpensive transducer elements to transmit and receive acoustical signals.

SUMMARY OF THE INVENTION (DISCLOSURE OF THE INVENTION)

The invention relates to methods and apparatus for monitoring chemical and physical changes in a substance undergoing a phase shift, particularly a curing resin.

According to the invention, there is provided a method of monitoring the curing of a resin comprising disposing a flexible waveguide between two points, surrounding an intermediate segment of the waveguide with resin, allowing the resin to begin curing, propagating at least one acoustic wave through the waveguide while the resin is curing, and monitoring the acoustic wave, wherein disposing a flexible waveguide comprises providing a waveguide fashioned from a plurality of bundled fibers. In this method, disposing a flexible waveguide between two points comprises placing the face of a first transducer in contact with a first segment of the waveguide, and placing the face of a second transducer in contact with a second segment of the waveguide, to place the transducers and waveguide in an acousto-ultrasonic configuration. In such a configuration, placing the face of a first transducer comprises holding the face parallel to the first segment, and placing the face of a second transducer comprises holding the face parallel to the second segment of the waveguide.

Another method of the invention comprises suspending a waveguide between two points, adhering resin to an intermediate segment of the waveguide whereby the resin contacts only the intermediate segment and the ambient air, allowing the resin to begin curing, propagating at least one acoustic wave through the waveguide while the resin is curing, and monitoring the acoustic wave. Suspending a waveguide optionally but preferably comprises disposing a the waveguide through a space within a heating chamber. Allowing the resin to begin curing may comprise heating the resin. In the preferred method, adhering the quantity of resin to an intermediate segment comprises daubing a quantity of liquid resin sufficient to cover the circumference of the intermediate segment. Preferably, propagating at least one acoustic wave comprises placing the face of a transducer in contact with a segment of the waveguide, and transmitting with the transducer at least one acoustic wave along the waveguide. Monitoring the acoustic wave preferably comprises placing the face of a transducer in contact with a first segment of the waveguide, receiving with the transducer the at least one acoustic wave; and measuring the wave propagation time. The preferred method also includes locating the transducer outside the space within the heating chamber.

Also according to the invention, there is provided a method of monitoring physical or chemical changes in a resin during curing, comprising suspending a waveguide between two points; placing the face of a first transducer in contact with a first segment of the waveguide; placing the face of a second transducer in contact with a second segment of the waveguide; hanging by adhesion to an intermediate segment of the waveguide, between the first segment and the second segment, a quantity of liquid resin; allowing the quantity of resin to begin curing; transmitting with the first transducer acoustic waves along the waveguide; receiving the acoustic waves with the second transducer; and monitoring the received acoustic waves while the resin is curing. Preferably, suspending a waveguide comprises disposing a the waveguide through a space within a heating chamber and locating first and second segments of the waveguide outside the heating chamber. In the preferred method, placing the face of a first transducer comprises holding the face parallel to the first segment, and placing the face of a second transducer comprises holding the face parallel to the second segment. Hanging by adhesion a quantity of liquid resin preferably comprises daubing a quantity of liquid resin sufficient to cover the circumference of the intermediate segment. Monitoring the acoustic waves comprises measuring wave propagation time.

Still in further accordance with the invention, there is provided an apparatus for monitoring physical or chemical changes in a resin during curing, the apparatus comprising a waveguide suspended in space; a first transducer, having a face in contact with a first segment of said waveguide, for transmitting acoustic waves along said waveguide; a second transducer, having a face in contact with a second segment of said waveguide, for receiving the acoustic waves; an intermediate segment of said waveguide, between said first segment and said second segment, upon which a liquid quantity of the resin clings by adhesion; and means for monitoring the acoustic waves while the resin cures. The waveguide preferably is disposed through a space within a heating chamber, with first and second segments of said waveguide disposed outside said heating chamber. Preferably, the face of said first transducer is parallel to the first segment, and the face of said second transducer is parallel to said second segment. A circumference of said intermediate segment is covered by the quantity of resin. Preferably, the means for monitoring comprises means for measuring wave propagation time.

A primary object of the present invention is to provide a means and method of monitoring changes in a resin while curing which may be practiced on small quantities of resin.

A primary advantage of the present invention is that it is energy efficient, does not require any highly customized equipment, and may efficiently be practiced on modest sample sizes of resin.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The invention relates to a method and apparatus for monitoring the physical and chemical changes that occur in a resin when the resin cures. Certain physical and chemical qualities of a resin, such as density and polymerization, undergo change in degree or character while a resin cures— in fact, taken together chemical and physical changes define the overall metamorphosis referred to as "curing." Typically, most resins undergo a phase shift from liquid (perhaps viscous liquid) to solid during curing. The apparatus and method of this invention may find beneficial use in monitoring the curing (or melting) of practically any substance, such as thermoplastics, cements, epoxies, or even water, which undergoes a phase shift from liquid to solid (or from solid to liquid) due to changes in environmental temperature or the presence of a catalyst. Resins which polymerize during curing undergo changes which are particularly amendable to monitoring by this invention, and it is in the field of resin cure monitoring that the invention finds primary application. In the disclosure and claims, "resin" may be broadly construed to include any substances whose phase shift during curing or melting is sought to be monitored.

Broadly described, the invention comprises a method and apparatus for monitoring curing whereby a waveguide is suspended in space, a quantity of liquid resin is adhered to or placed in surrounding contact with an intermediate segment of the waveguide, and acoustic signals are propagated through the waveguide. The acoustic signals propagating through the waveguide are affected by the presence and degree of cure of the quantity of resin, and the manner or degree to which the signals are affected at a particular time is dependent and correlative to the degree to which the resin has cured. Typically, the acoustic waves, which preferably are ultrasonic, are generated and transmitted by a transducer in communication with one end portion of the waveguide, and are received by a second transmitter in communication with a second end portion of the waveguide. Acoustic waves generated by one transducer therefore move along the waveguide, through and past the quantity of curing resin, to be received by the other transducer. Effective monitoring is performed by digital signal analyzers in communication with the transducers.

Figure 1A:
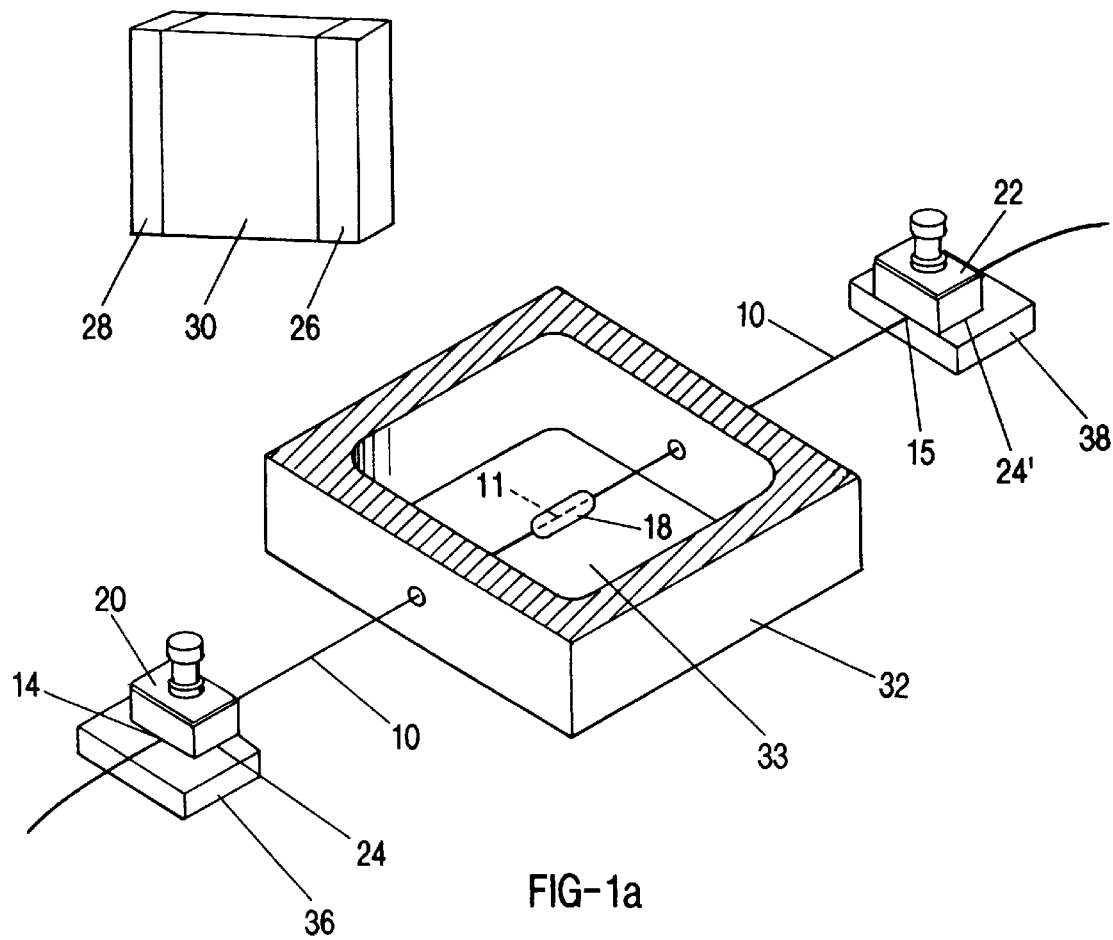
FIG. 1A is a perspective partially sectional view of one preferred embodiment of the invention, showing a small quantity of resin clinging to a waveguide within a heating chamber.

Attention is invited to FIG. 1A, depicting one possible configuration of the apparatus of the invention. The principal components of the apparatus include a two-ended tow or waveguide 10, end portions of which are in contact with a first transmitter transducer 20 and a second or receiver transducer 22, respectively. The first transducer 20 is in signal communication (e.g as by electrical wiring) with a pulser 28 of known construction, which in turn is in communication with a signal analyzer 30. The second transducer 22 is in signal communication with a preamplifier 26 of known construction, which provides amplified signal input to the signal analyzer 30. In the preferred embodiment, the waveguide 10 is disposed through the interior space 33 defined within a heating chamber 32 such as a laboratory test oven. During the practice of one embodiment of the invention, a small quantity (for example, approximately 1.0 cm$^3$) of resin 18 is adhered to an abbreviated intermediate segment 11 of the waveguide 10. Very preferably, a first segment 14 and a second segment 15 of the waveguide 10 are disposed entirely outside of the interior space 33 contained by the heating chamber 32.

The waveguide 10 is suspended in space between two generally horizontally separated points. The waveguide 10 comprises a cord or a filament, which allows acoustic signal transmission. In the most preferred embodiment, and as suggested by FIG. 1B (not precisely to scale) the waveguide 10 is composed of a bundled plurality of thin (about 10 $\mu$m diameter) strands of glass fibers. Alternatively, the waveguide may be fashioned from bundled carbon, graphite, or Kevlar® strands or fibers. The waveguide 10 accordingly is substantially bendable while retaining elasticity which permits efficient longitudinal wave transmission. As illustrated by FIG. 1A, the intermediate segment 11 of the waveguide 10 preferably is disposed within the space 33 within the heating chamber 32. The waveguide 10 is of sufficient length as to extend through the interior space 33 and to the exterior of the heating chamber 32 to allow the pair of ultrasonic transducers 22, 22 to be coupled on opposite end portions of the waveguide 10. In this manner, sufficient separation distance is provided between the heating chamber 32 and the transducers 20, 22. The transducers 20, 22 thus are not exposed to the elevated temperatures employed to promote curing of the resin 18, and therefore may be of ordinary construction.

In the preferred embodiment, the transducers 20, 22 are coupled to the waveguide 10 in an acousto-ultrasonic configuration. In an acousto-ultrasonic configuration, the bottom surface or "face" of each transducer, that is, the functional surfaces 24, 24' of corresponding transducers 20, 22 responsive to the reception of acoustic energy, are placed against the surface of the waveguide 10. Preferably, each face 24, 24' is placed in parallel contact with the waveguide 10; more specifically, a face 24 of the first transducer 20 is placed in direct contact with a first segment 14 of the waveguide 10, and the face 24' of the second transducer 22 is placed in contact with a second segment 15 of the waveguide. Preferably, the parallel contact between the transducers 20, 22 and the respective segments 15, 15 is accomplished by clamping or sandwiching the waveguide 10 between the transducers 20, 22 and a pair of elastomer pads 36, 38 so that the waveguide 10 is held, by friction, in tense suspension.

An advantage of the invention is the of the operation of the transducers 20, 22 in the acousto-ultrasonic configuration, with the transducer faces 24, 24' placed parallel to the direction of wave transmission. Some monitors known in the art employ as waveguides various types of rods that are substantially rigid (i.e. unbending under laterally or radially applied forces). The ends of the rods are then coupled with transducers in a through-transmission configuration, that is, with the faces of the transducers placed perpendicular to the direction of wave transmission, and the end of the rod contacting a transducer at a single focus point. The acousto-ultrasonic configuration of the present invention functions with the use of the flexible waveguide 10, preferably comprised of bundled or compacted fibers such as glass or carbon fibers, which is bendable in response to laterally applied forces. A flexible waveguide 10 permits the acoustic waves to be transmitted and received by respective faces 24, 24' of the transducers placed in parallel contact with the waveguide. The acousto-ultrasonic configuration heightens the reliability of the signal processing and promotes more accurate wave-signal to curing condition correlations.

The signal analyzer 30 includes a computer or oscilloscope with signal digitizing capabilities; most state of-the art desktop computers can be programmed by one skilled in the art to perform signal processing functions. An oscilloscope may function as an alternative means for performing signal analysis. In the preferred embodiment, the signal analyzer 30 incorporates a central processing unit (CPU) to permit the signal analyzer to perform data storage, data retrieval, and data evaluation and comparison functions, so that the user may perform signal analysis on either a real time or delayed basis. The signal analyzer system 30 includes an analogue-to-digital converter, whereby analogue signals from the preamplifier 26 are digitized for processing by the CPU.

The pulser 28 is a device of known construction for generating controlled pulses of electrical energy. The actuation of the purser 28 may be manually regulated by the operator, or preferably is controlled and regulated via the CPU of the signal analyzer 30. The pulser 28 sends electrical signals of preselected description (e.g. amplitude and or frequency) to the first transmitter transducer 20. First transducer 20 converts the electrical signals into corresponding acoustic waves, and transmits the acoustic waves into the first segment 14 and on into the waveguide 10.

Acoustic waves transmitted by the first transducer 20 propagate through the waveguide 10 and through the second segment 15 to the second, or receiving, transducer 22. Second transducer 22 receives the acoustical waves in the waveguide 10 and converts them into corresponding electrical signals. An electrical signal generated by the second transducer 22 is dissimilar to the source electrical signal originally produced by the pulser 28 due to the presence of the resin 18 upon the waveguide 10, as further described. The preamplifier 26 is a device of known construction for receiving and amplifying pulses of electrical energy. The preamplifier 26 receives electrical signals from the second transducer 22, and inputs the amplified signals into the signal analyzer 30 for analysis.

A marked advantage of the invention is that a small quantity of resin may be used to perform the monitoring tests, thus reducing the amount of energy required to perform the monitoring, and eliminating the need to employ molds or containers to hold uncured liquid resin. Prior art devices monitoring the curing of bulk bodies of resin necessitate the use of special containers for holding the resin during the monitoring process; in devices employing exteriorized transducers, specialized seals must be used in the walls of the resin container to permit a waveguide to pass through the walls of the container without also permitting leakage of liquid resin or liquid by-products of the curing process.

Figure 2:
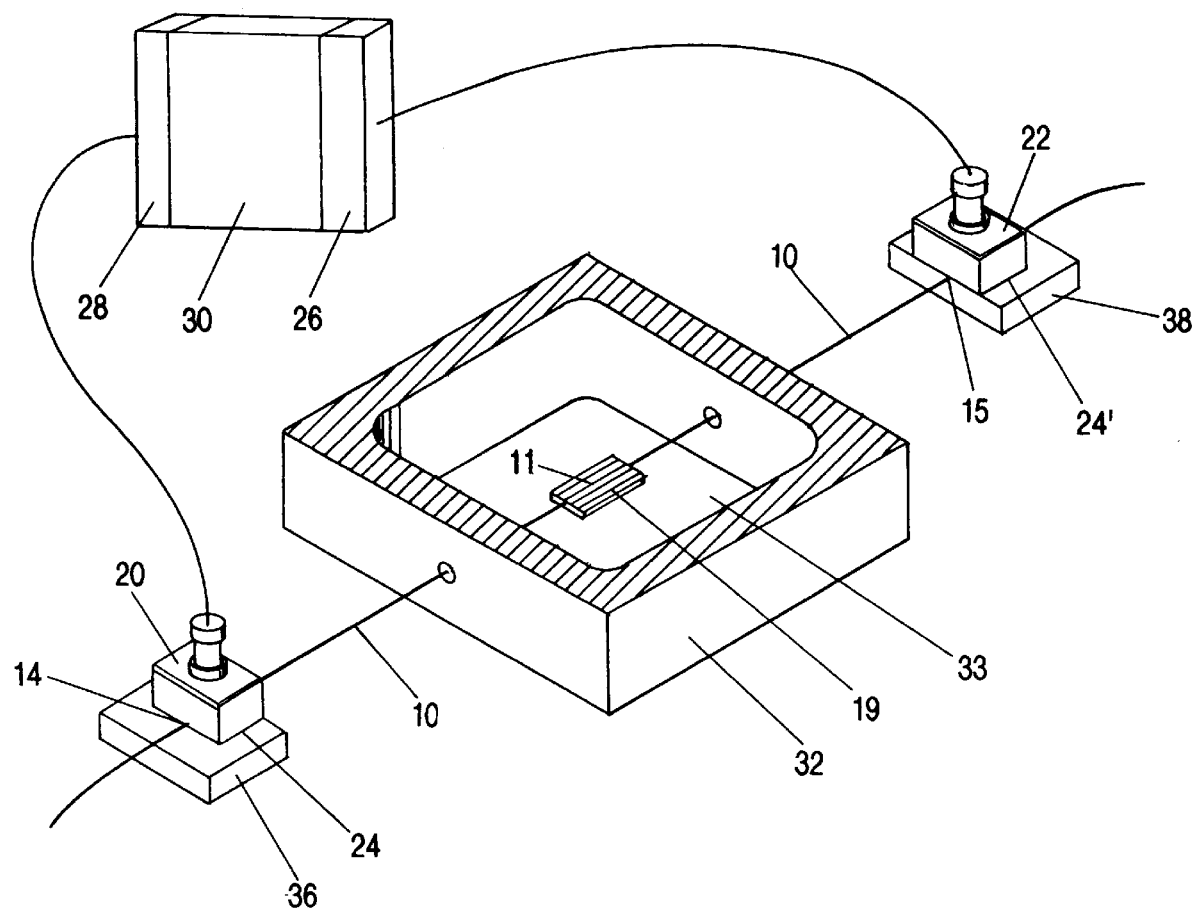
FIG. 2 is a perspective partially sectional view of an alternative embodiment of the invention, showing a composite wafer or prepeg on the waveguide.

The present invention nevertheless also be used to monitor the cure rate of a composite or prepreg material. FIG. 2 shows the system setup of an alternative embodiment for monitoring changes in a composite or prepreg material 19. The prepeg 19 clings to the intermediate segment 11 of the waveguide 10. Also, the invention may be beneficially practiced even with a bulk body of resin in situ within a container or form; the advantages of the acousto-ultrasonic configuration of transducers 20, 22 in combination with a flexible waveguide 10 promotes increased sensitivity and reliability of testing results even when the waveguide 10 is surrounded by resin poured into a mold or container, within or without a heating chamber.

Figure 1B:
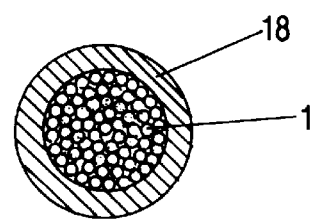
FIG. 1B is an enlarged radial sectional view of a quantity of resin clinging to an intermediate segment of the waveguide of FIG. 1A.

Combined reference is made to FIGS. 1A and 1B. In one embodiment of the invention, the intermediate segment 11 of the waveguide 10, between the first segment 14 and the second segment 15, serves as the element upon which a quantity of the resin 18 may cling by adhesion. Notably, the resin is adhered to intermediate segment 11 so that the resin 18 contacts only the intermediate segment and the surrounding ambient air. In a preferred embodiment and practice of the invention, therefore, liquid resin 18 effectively clings upon the waveguide 10 by the forces of cohesion between resin molecules and adhesion between the resin and the waveguide. The user of the invention hangs the resin 18 upon the waveguide 10 by daubing a quantity of liquid resin upon the intermediate segment 11 of the waveguide 10, but avoids application of excess resin whose weight would overcome surface tension and cohesive forces and drip down and fall from the waveguide.

The quantify of resin 18 very preferably completely wets the intermediate segment 11. The user daubs a quantity of liquid resin 18 sufficient to cover the circumference of the intermediate segment 11, as indicated by FIG. 1B. If the circumference is not covered for at least a portion of the intermediate segment 11, the reliability of the monitoring data may be compromised; preferably, the resin 18 is disposed upon the waveguide 10 in a substantially axially symmetric configuration, as indicated in FIG. 1B. Internal cohesive forces within the resin 18 tend to promote a symmetrical disposition around the intermediate segment 11.

Preferably, the resin-saturated intermediate segment 11 is then placed within the enclosed interior space 33 of the heating chamber 32. Heating chamber 32 may be a conventional laboratory oven having an appropriate thermostat and temperature controller. Clinging by adhesion upon the intermediate segment 11, in contact only with the intermediate segment 11 (and with the ambient or environmental air within the interior space 33), the resin 18 is cured following the manufacturer's recommended curing cycle. Alternative curing cycles may also be used to examine the resin's response to other heating cycles.

In alternative embodiments, comparatively larger quantities of resin may be used which contact and contain the resin 18, in volumes larger than that which may cling by adhesion alone to the intermediate segment. In such alternative embodiments, the circumference of the intermediate segment 11 still is covered by resin 18 such that the resin 18 is surrounded by, or essentially immersed in, the resin to be monitored.

The use of a waveguide 10 made from a fiber matrix or bundled strands advantageously permits the liquid resin 18 to saturate the waveguide to its central axis, which promotes the ability of the waveguide to transmit an acoustic signal through the intermediate segment 11 without unduly damping the signal. This, the resin 18 whose curing is to be monitored preferably not only covers and surrounds the intermediate segment 11, but preferably also penetrates into the interstitial voids between and among the individual fibers constituting the waveguide 10. In this manner, the changing conditions of the resin 18 are accurately and immediately manifested by changes in the velocity of acoustic waves along the waveguide 10 and through the intermediate segment 11, yet the waveguide 10 does not unacceptably dampen the waves while serving as the monitoring wave transmission medium.

The inventive method is generally apparent from the foregoing description of the apparatus. Resin 18 is hung upon a short length of the intermediate segment 11 of a long waveguide or fiber tow 10 to provide a resin-saturated section of waveguide. Alternatively, the intermediate segment 11 is surrounded by resin 18 disposed within a mold or container. The resin saturated intermediate segment 11 is placed in an enclosed heating chamber 32 with an appropriate temperature controller and cured following the resin manufacturer's recommended curing cycle. The ends of the waveguide 10 extends outside the heat chamber 32 a sufficient distance that the first and second segments 14, 15 of the waveguide 10, where the transducers 20, 22 are located, are at a temperature which will not cause damage to the transducers. No complicated cooling system is needed. The resin 18, regardless of volume or quantity, is then permitted to begin curing.

Ultrasonic energy is transmitted from the first transducer 20 to the E-glass waveguide 10. The ultrasonic energy propagates in the form of a longitudinal waves along the waveguide 10, to and through the intermediate segment 11 to which the resin 18 is adhered. The longitudinal wave is then received by the receiving transducer 22 and converted from ultrasonic energy to an electrical signal which can be digitized and analyzed. Persons of skill in the art will recognize that single-transducer embodiments of the invention may be devised where one end of the waveguide 10 is fixed to an immovable point, and the other end is coupled with a transducer. In such an embodiment, the acoustic waves are transmitted by the transducer, and then "bounce" off the fixed attachment point, and the single transducer then receives the "echo" signal.

The longitudinal wave propagating through the waveguide 10 is sensitive to changes in both physical and chemical changes occurring within the resin 18 during the curing cycle. The physical and chemical changes occurring within the resin 18 affect the amplitude and velocity of the longitudinal acoustical wave. By monitoring the amplitude or speed of propagation of the longitudinal acoustical wave propagating through the waveguide 10, including the intermediate portion 11 with the resin 18 thereon, the physical and chemical state of the resin can be known at all stages of the curing cycle. Physical and chemical changes occurring within the resin 18 during the curing cycle that can be monitored using the invention include without limitation resin flow, viscosity changes, and degree of cure.

Accordingly, the process of the invention includes a method of monitoring the curing of a resin. The user suspends the waveguide 10 between two points and adheres some quantity of resin 18 to an intermediate segment 11 of the waveguide or surrounds the intermediate segment 11 with resin 18. In one embodiment, the resin 18 adhering to the waveguide 10 contacts only the intermediate segment 11 and the ambient air surrounding the waveguide. The user preferably allows the liquid resin 18 to penetrate into the intermediate segment 11 and begin curing, and then propagates at least one acoustic wave through the waveguide 10 while the resin is curing, and monitors the acoustic wave. In one preferred method, the user suspends a waveguide 10 fashioned from E-glass through a space 33 within a heating chamber 32. Allowing the resin 18 to begin curing optionally may include warming the resin in the chamber 32. To adhere the quantity of resin 18 to the intermediate segment 11, the user of the invention daubs a quantity of liquid resin sufficient to cover the circumference of the intermediate segment. Alternatively, the waveguide 10 can be surrounded by resin by immersing the intermediate segment 11 therein. To propagate at least one acoustic wave, the user places the face of a transducer 20 in contact with a segment 14 of the waveguide 10, and transmits with the transducer at least one acoustic wave along the waveguide 10. Monitoring the acoustic wave comprises placing the face 24 of a transducer 20 in contact with a first segment 14 of the waveguide 10 and receiving with the transducer 20 or 22 the acoustic wave; and measuring the acoustic wave propagation time (time of flight, or elapsed transmission time between transducers). The preferred manner of monitoring or evaluating the acoustic wave is by measuring the wave propagation time or "time of flight" to determine changes in wave speed, which may then be correlated with changes in resin viscosity or resin cross-linking processes during curing. The user preferably disposes the intermediate segment 11 within a space 33 within the heating chamber 32 to heat cure the resin while locating the transducer 20 outside the space within the heating chamber.

Industrial Applicability

The invention is further illustrated by the following non-limiting examples.

EXAMPLE 1

A six-foot length of multi-filament fiber tow was cut to fashion a waveguide and inserted through the ⅛" diameter openings at each end of a heating chamber. The heating chamber was an oven with temperature controls. The fiber tow waveguide consisted of several 10-micron diameter E-glass filaments wound into a single tow. One end of the waveguide was placed on top of an elastomer pad mounting surface remote from the heating chamber. A 0.5 MHZ broadband pulsing transducer (Panametrics Co.) was then placed on top of the elastomer pad, sandwiching the waveguide parallel between the face of the pulsing transducer and the elastomer pad. A 0.5 MHZ broadband receiving transducer (Panametrics Co.) was similarly placed on top of the elastomer pad on the opposite end of the waveguide, sandwiching the waveguide between the receiving transducer and the elastomer pad. This type of pulser/receiver arrangement (as shown in FIG. 1) is typically called an acousto-ultrasonic configuration. In an acousto-ultrasonic configuration, both the sending and receiving transducers are mounted at normal incidence to the surface of the specimen, in this case being the fiber tow waveguide. Spring-loaded transducer mounting brackets were used to apply a constant pressure on the transducers. In the acousto-ultrasonic configuration, a longitudinal acoustic wave is generated by the pulsing transducer. The longitudinal wave is propagated along the entire length of the wave guide and received by the receiving transducer.

A small amount of Dow Chemical's TACTIX® 177 epoxy resin was mixed at room temperature with the manufacturer's recommended TACTIX-H78® hardener. The resin was then carefully applied to a ¼" length of fiber tow waveguide inside the heating chamber. The resin was allowed to gel for one hour. A thermocouple was placed inside the heating chamber in order to accurately monitor the temperature near the resin. The resin was then cured following the manufacturer's recommended cure schedule. The temperature was ramped at 5° per minute to 125° F. and then held for 30 minutes. The temperature was then ramped to 250° and held for 3 hours.

An ultrasonic sound wave "longitudinal wave" was transmitted through the waveguide from the pulsing transducer, through the resin, and to the receiving transducer during the entire cure schedule. Changes in wave propagation time or time of flight (TOF), that is, the time required for a wave to move from the pulsing transducer to the receiving transducer, were monitored using a digital desk top computer. The propagation time was monitored in-situ by placing gates or markers at certain locations of the signal wave envelope and monitoring the location of these gates. Data was taken at one minute time intervals and plotted in FIG. 3. The speed of the acoustic waves was determined from the TOF, although the amplitude of the ultrasonic signals may also be monitored.

Figure 3:
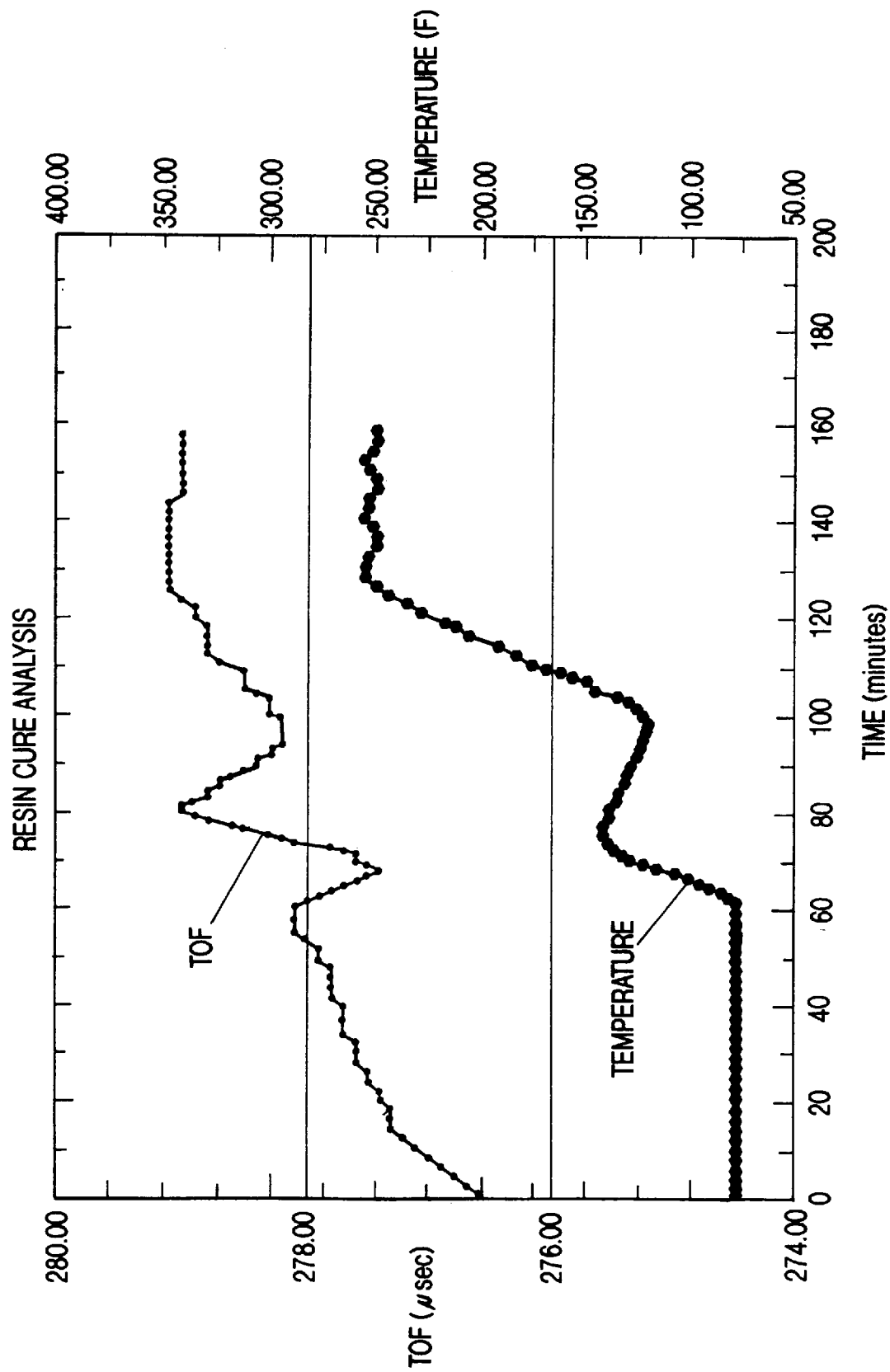
FIG. 3 is a graphical representation of a comparison of wave propagation time with temperature as functions of time for purposes of performing a resin cure analysis according to the invention.
Figure 4:
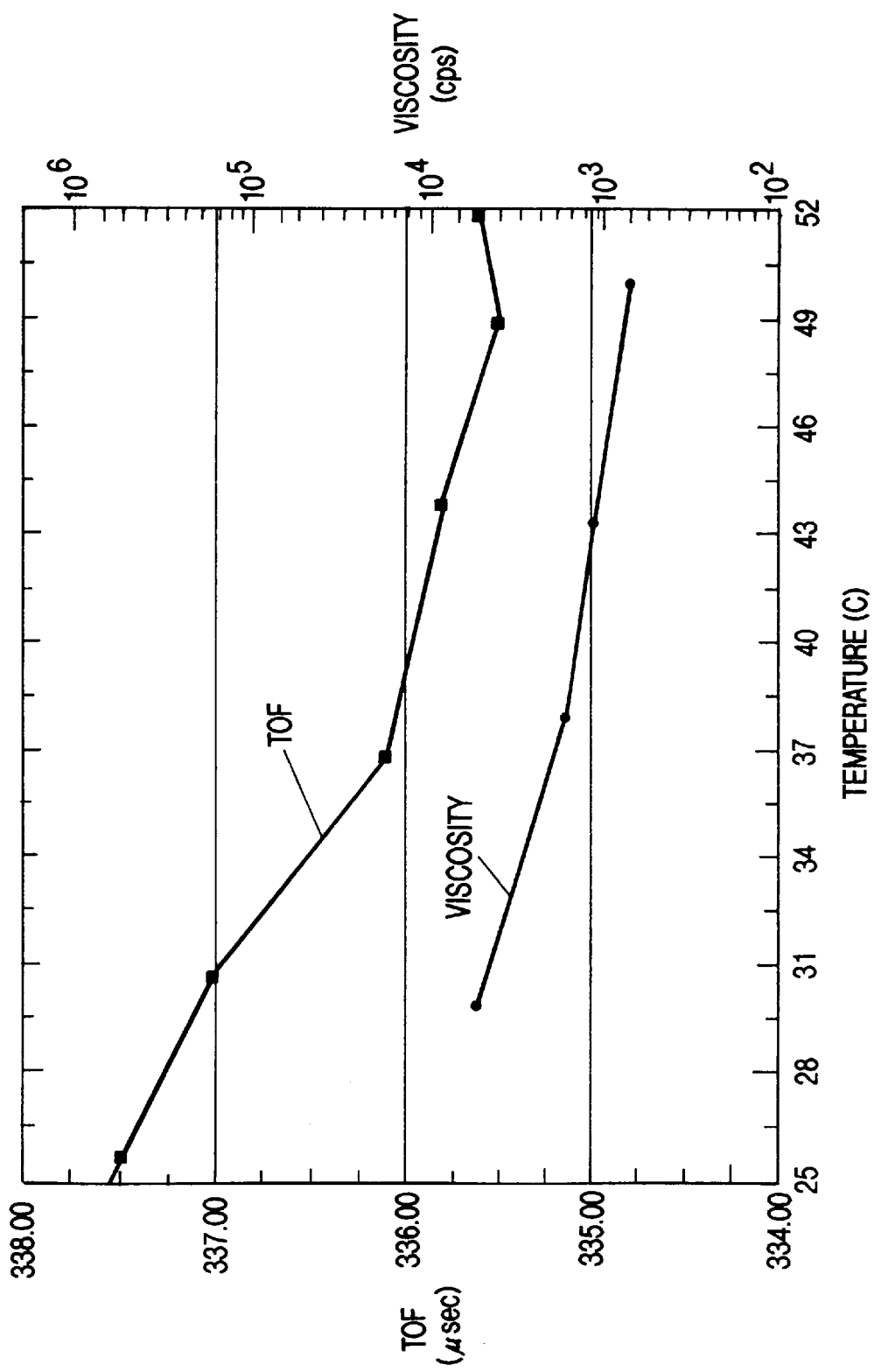
FIG. 4 is a graphical representation of a comparison of wave propagation time with viscosity as functions of time according to the invention.
Figure 5:
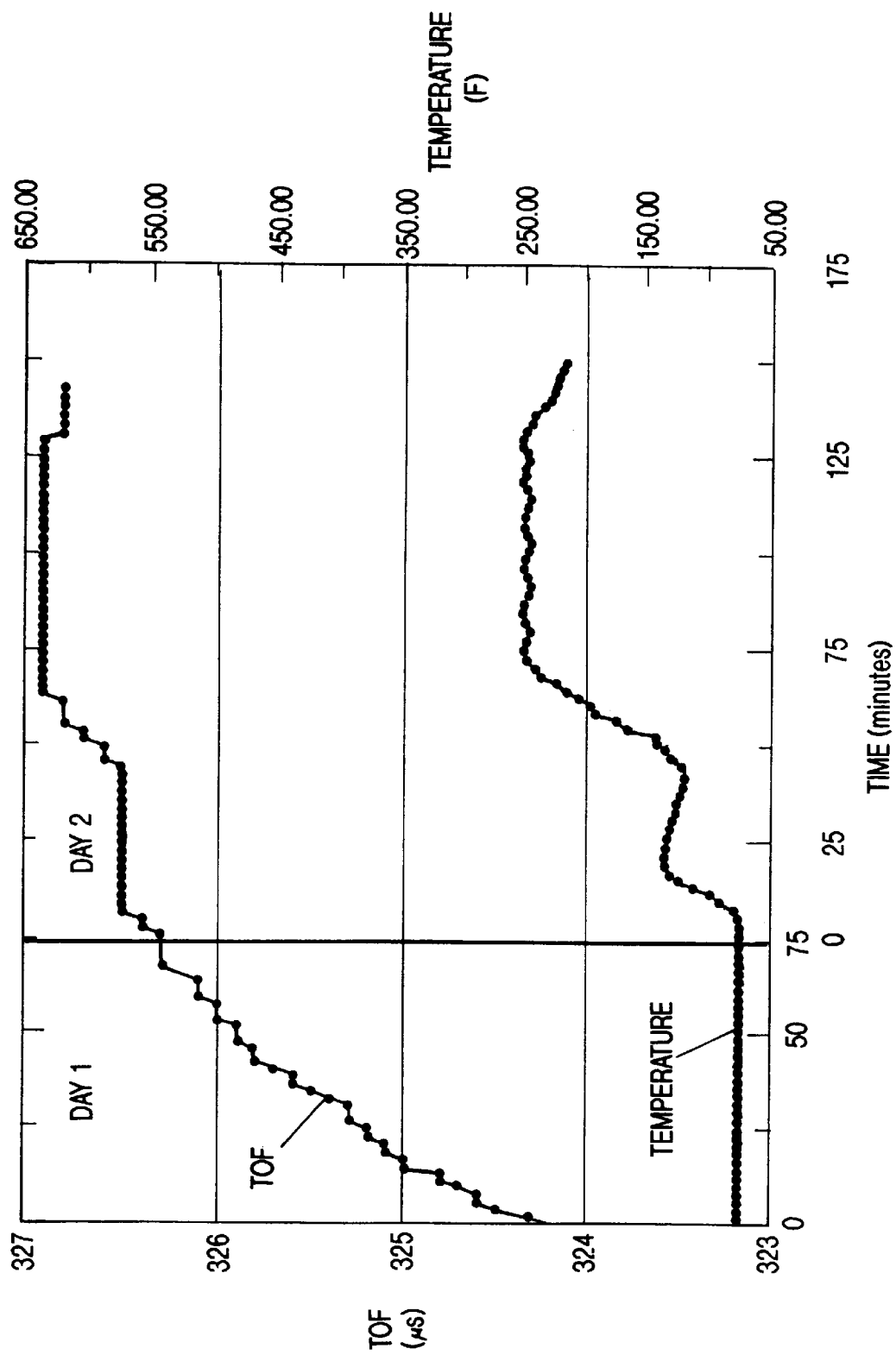
FIG. 5 is another graphical representation of a comparison of wave propagation time with temperature as functions of time according to the invention.
Figure 6:
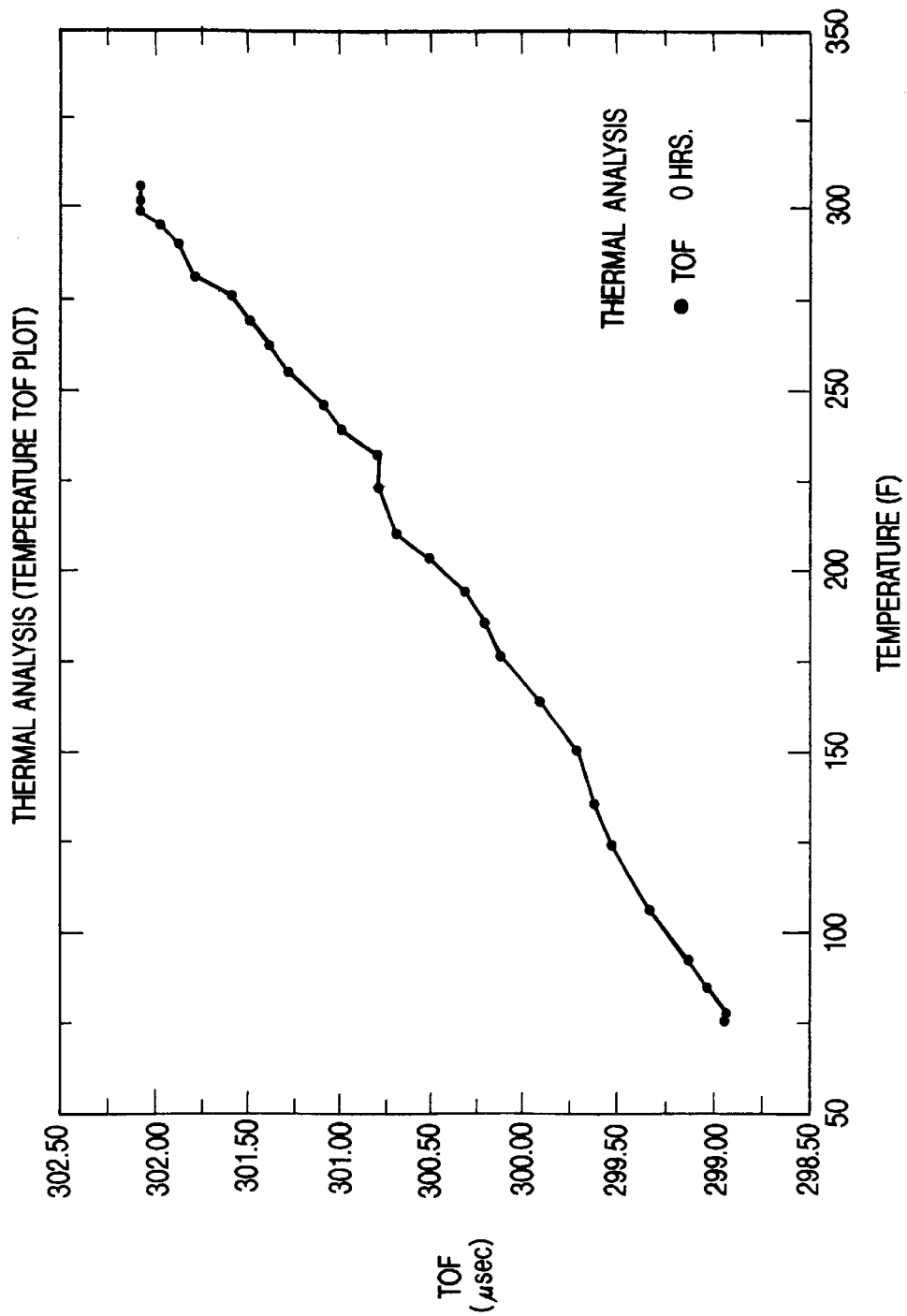
FIG. 6 is a graph of initial wave propagation time as a function of temperature according to the invention.

In FIG. 3, the temperature was first ramped to 125° F. and held for 30 minutes. The temperature overshot to about 135° F., then decreased to 125° F. The changes in the TOF during this time corresponded to the changes in viscosity and to the actual cross-linking of the resin. At a low resin viscosity, the fiber tow waveguide acted as the main propagation medium for the ultrasonic sound waves and thus the wave had a lower TOF corresponding to a greater wave velocity. FIG. 4 shows a comparison of the viscosity curve as published by DOW Chemical for TACTIX® 177 resin and the TOF data obtained by means of the invention. The graph shows a corresponding decrease in TOF for a decreasing viscosity. As more cross-linking took place, the viscosity increased, resulting in an increase in TOF. Eventually a 3-D solid network was formed in the resin. The fiber and the resin then began to behave like a composite and the wave characteristics changed as the wave traveled through the composite. As a consequence, the speed of propagation of the ultrasonic signal increased and the corresponding TOF decreased. Information about the rate of cross-linking and the degree of cross-linking was obtained from this data. In FIG. 5, the resin was allowed to solidify overnight, DAY 1, then was run through the standard cure cycle in DAY 2. The graph shown in FIG. 5 shows no decease in the TOF during the cure cycle for DAY 2. This indicates that enough cross-linking took place overnight and thus the resin/fiber combination took on the properties of a composite. The temperature shown in FIG. 3 was then ramped to 250° F. At this stage, an increase in temperature resulted in a corresponding increase in the TOF, which indicated a slower wave velocity. This observation was confirmed in another test the data plotted in FIG. 6. It shows the change of the TOF due to increasing temperature for a cured resin/fiber specimen. The temperature is then held at 250° F. for three hours, as shown in FIG. 3. During this time, the TOF remained constant. As the longitudinal wave traveled along the fiber to the composite, a lamb wave was excited within the resin/fiber composite. The wave then left the composite and only the symmetric component of the lamb wave traveled along the waveguide. The symmetric component of the lamb wave was then received by the receiving transducer. These examples show that the resin cure monitoring system is also a feasible system for monitoring prepregs and composites.

In this example, two 0.5 MHZ transducers (Panametrics Co.) were used, but lower frequency transducers in the 5 to 20 kHz range will provide a stronger signal. The pulsing transducer was connected to a pulsing/receiving hardware card installed inside an Everex computer. The receiving transducer was first connected to a preamplifier (Panametrics Co.), which in turn was connected to the pulsing/receiving card. The received ultrasonic signal was monitored using signal analysis software. The pulsing/receiving hardware and software are available off the shelf as a complete package from companies such as Physical Acoustics Corporation, or alternatively may be assembled by purchasing separate hardware and software components from various manufacturers.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding provisional application, are hereby incorporated by reference.

What is claimed is:

1. A method of monitoring the curing of a resin comprising:
    disposing a flexible waveguide, fashioned from a plurality of bundled fibers, between two points;
    surrounding an intermediate segment of the waveguide with resin;
    allowing the resin to penetrate into intersticial voids between and among the fibers:
    allowing the resin to begin curing;
    propagating at least one acoustic wave through the waveguide while the resin is curing; and
    monitoring the acoustic wave.

2. The method of claim 1 wherein disposing a flexible waveguide between two points comprises:
    placing the face of a first transducer in contact with a first segment of the waveguide;
    placing the face of a second transducer in contact with a second segment of the waveguide.

3. The method of claim 2 wherein placing the face of a first transducer comprises holding the face of the first transducer parallel against the first segment, and wherein placing the face of a second transducer comprises holding the face of the second transducer parallel against the second segment.

4. A method of monitoring the curing of a resin comprising:
    suspending a waveguide between two points;
    adhering resin to an intermediate segment of the waveguide whereby the resin contacts only the intermediate segment and the ambient air;
    allowing the resin to begin curing;
    propagating at least one acoustic wave through the waveguide while the resin is curing; and
    monitoring the acoustic wave.

5. The method of claim 4 wherein suspending a waveguide comprises disposing a waveguide through a space within a heating chamber.

6. The method of claim 5 wherein allowing the resin to begin curing comprises heating the resin.

7. The method of claim 4 wherein adhering the quantity of resin to an intermediate segment comprises daubing a quantity of liquid resin sufficient to cover the circumference of the intermediate segment.

8. The method of claim 4 wherein propagating at least one acoustic wave comprises:
    placing the face of a transducer in contact with a segment of the waveguide; and
    transmitting with the transducer at least one acoustic wave along the waveguide.

9. The method of claim 8 wherein monitoring the acoustic wave comprises;
    placing the face of a transducer in contact with a first segment of the waveguide; and
    receiving with the transducer at least one acoustic wave; and
    measuring the wave propagation time.

10. The method of claim 9 further comprising disposing the intermediate segment within a space within a heating chamber, and wherein allowing the resin to begin curing comprises heating the resin, and further comprising locating the transducer outside the space within the heating chamber.

11. A method of monitoring physical or chemical changes in a resin during curing, comprising:
    suspending a waveguide between two points;
    placing the face of a first transducer in contact with a first segment of the waveguide;
    placing the face of a second transducer in contact with a second segment of the waveguide;
    hanging by adhesion to an intermediate segment of the waveguide, between the first segment and the second segment, a quantity of liquid resin;
    allowing the quantity of resin to begin curing;
    transmitting with the first transducer acoustic waves along the waveguide;
    receiving the acoustic waves with the second transducer; and
    monitoring the received acoustic waves while the resin is curing.

12. The method of claim 11 wherein suspending a waveguide comprises disposing a the waveguide through a space within a heating chamber.

13. The method of claim 12 further comprising locating the first and second segments of the waveguide outside the heating chamber.

14. The method of claim 11 wherein placing the face of a first transducer comprises holding the face of a first transducer parallel against the first segment, and wherein placing the face of a second transducer comprises holding the face of a second transducer parallel against the second segment.

15. The method of claim 11 wherein hanging by adhesion a quantity of liquid resin comprises daubing a quantity of liquid resin sufficient to cover the circumference of the intermediate segment.

16. The method of claim 15 wherein suspending the waveguide comprises disposing the intermediate segment within a space within a heating chamber.

17. The method of claim 16 wherein allowing the quantity of resin to begin curing comprises heating the quantity of resin.

18. The method of claim 11 wherein evaluating the acoustic waves comprises measuring wave propagation time.

19. An apparatus for monitoring physical or chemical changes in a resin during curing, comprising:

a flexible waveguide comprising a plurality of bundled fibers;

a first transducer, having a face in contact with a first segment of said waveguide, for transmitting acoustic waves along said waveguide;

a second transducer, having a face in contact with a second segment of said waveguide, for receiving the acoustic waves;

an intermediate segment of said waveguide, between said first segment and said second segment, surrounded by the resin; and means for monitoring the acoustic waves while the resin cures, wherein the resin penetrates into interstitial voids between and among said fibers of said intermediate segment.

20. An apparatus according to claim 16 wherein said waveguide is disposed through a space within a heating chamber.

21. An apparatus according to claim 20 wherein said first and second segments of said waveguide are disposed outside said heating chamber.

22. An apparatus according to claim 19 wherein said face of said first transducer is parallel to the first segment, and wherein said face of said second transducer is parallel to said second segment.

23. An apparatus according to claim 16 wherein the resin clings by adhesion to the intermediate segment, whereby the resin contacts only the intermediate segment and the ambient air.

24. An apparatus according to claim 16 wherein said means for monitoring comprises means for measuring wave propagation time.

* * * * *